(12) United States Patent
Fink (10) Patent No.: US 6,771,164 B1
(45) Date of Patent: Aug. 3, 2004

(54) AUTOMATIC IDENTIFICATION OF LOCAL DEVICES

(75) Inventor: Ronald Fink, Huntingdon Valley, PA (US)

(73) Assignee: NRC Corporation, Dayton, OH (US)

( * ) Notice: Subject to any disclaimer, the term of this patent is extended or adjusted under 35 U.S.C. 154(b) by 0 days.

(21) Appl. No.: 10/235,306

(22) Filed: Sep. 5, 2002

(51) Int. Cl.[7] .............................................. H04M 11/04
(52) U.S. Cl. ............................ 340/310.01; 340/310.08; 340/310.06; 340/3.1; 340/286.02
(58) Field of Search ....................... 340/310.01, 310.02, 340/310.08, 533, 825.72, 310.06, 506, 3.1, 286.02

(56) References Cited

U.S. PATENT DOCUMENTS

| | | | | |
|---|---|---|---|---|
| 5,805,053 A | * | 9/1998 | Patel | 340/310.01 |
| 5,929,748 A | | 7/1999 | Odinak | 340/310.01 |
| 6,026,150 A | | 2/2000 | Frank et al. | 379/90.1 |
| 6,091,320 A | | 7/2000 | Odinak | 340/310.01 |
| 6,167,120 A | | 12/2000 | Kikinis et al. | 379/90.01 |
| 6,535,110 B1 | * | 3/2003 | Arora | 340/506 |

* cited by examiner

*Primary Examiner*—Anh V. La
(74) *Attorney, Agent, or Firm*—Schwegman, Lundberg, Wosser, Kluth

(57) ABSTRACT

Techniques and devices for automatically identifying a local device are provided. An adapting device is interposed in between a local device and a central processing device. The adapting device receives a unique transmission frequency from the processing device over electrical power lines. The unique transmission frequency is communicated to the local device and is used by the local device and the processing device for subsequent communications. Moreover, in some embodiments, the local device provides a local device type to the adapting device that is sent by the adapting device to the processing device and used by the processing device to identify a command set recognized by the local device. In other embodiments, the adapting device translates messages sent from the processing device and communicates the messages to the local device. Furthermore, in some embodiments, the adapting device translates messages sent from the local device and communicates the messages to the processing device.

20 Claims, 3 Drawing Sheets

AUTOMATIC IDENTIFICATION OF LOCAL DEVICES

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2002, NCR Corp. All Rights Reserved.

FIELD OF THE INVENTION

The present invention relates to the automatic identification of local devices in an electronic environment. More specifically, the present invention is directed to automatically identifying local devices in a home network.

BACKGROUND OF THE INVENTION

Processing capabilities are currently being built into a number of consumer electronic devices/appliances, such as stereos, microwaves, air conditioners, furnaces, televisions, refrigerators, Video Cartridge Recorders (VCRs), Digital Versatile Disks (DVDs) recorders/players, lights, fans, telephones, facsimile machines, video cameras, Compact Disks (CDs) recorders/players, toasters, printers, scanners, personal digital assistants (PDAs), computers, ovens, and the others. These consumer devices are now being equipped with processors, memory, receivers, and transmitters. This additional hardware combined with minimal software permits a consumer's electronic devices/appliances to be more intelligent and integrated within a consumer's home to the consumer's main personal computer.

However, in order to fully integrate these electronic devices/appliances within a consumer's home to form a home network, the electronic devices/appliances have to be uniquely identifiable to the main personal computer. Conventionally, to achieve integration within the home network each device/appliance required a unique address, such as an Internet Protocol (IP) address. The unique address permits the main personal computer to manage and communicate with individual devices/appliances. But, providing a unique IP address becomes a problem for the consumer, since the number of devices/appliances could far exceed the number of available IP addresses on a network hub used by the consumer to interface with the main personal computer.

Moreover, the devices/appliances have to be equipped with the appropriate software to receive or identify itself using any assigned IP address. Further, the main personal computer needs to be manually configured to recognize each device/appliance using the appropriate IP address. The entire process of integrating the devices/appliances within the home to the main personal computer is laborious. Additionally, when old devices/appliances are eliminated from the home network, the IP addresses are not easily recycled within the home network. In fact, in many instances, each device/appliance within the home network is reconfigured with a new IP address when one device or appliance is removed from the home network.

Some solutions have tried to solve this problem by embedding hardware and software into the devices/appliances that permit the devices/appliances to communicate with the main personal computer within the network using existing electrical power lines within the home. Thus, existing Alternating Current (AC) wiring within the home is used to communicate between the devices/appliances and the main personal computer. Modulating signals on the electrical power lines at designated frequencies permit the main personal computer to uniquely identify and communicate with each of the devices/appliances participating in the home network. The signals can include commands and information that are defined within fields of the signals or are encoded in a standard protocol formats, such as X10 protocol format.

Yet, to implement existing techniques that utilize existing electrical power lines for communication with devices/appliances is expensive, since each device/appliance needs to be equipped with the appropriate hardware and software to communicate over the electrical power lines. In some cases, this may not be feasible with smaller appliances that are incapable of housing the appropriate hardware. And, in other cases, it is impractical to unduly inflate the cost of a device/appliance to include the necessary hardware and software. Moreover, since the appropriate hardware and software is coupled to the devices/appliances, it cannot be reused with another device/appliance that needs such hardware and software to communicate in the home network.

Other techniques have sought to tie consumer devices/appliances together with a main personal computer by using the existing phone lines within a home. Yet, with these techniques each device/appliance must be connected to a phone line within the home. In some instances, a device or appliance may not be located within the home near an existing phone outlet making these techniques undesirable to a consumer. Moreover, the devices/appliances must be equipped with a port to accept a phone line, which is used for communication to a main personal computer of the home network.

As is apparent, there exists a need for providing techniques and devices that can more readily and flexibly permit devices/appliances within a consumer's home to be tied together in a home network with a main personal computer. Additionally, unique identification hardware and software associated with the devices/appliances should be decoupled from the devices/appliances. Moreover, automatic identification of devices/appliances is needed so that no manual configuration of the main personal computer is required before the devices/appliances become usable within the home network.

SUMMARY OF THE INVENTION

In various embodiments of the present invention techniques are devices are described to automatically identify local devices. The local device can be intelligent appliance within a home network that is interfaced to a central processing device (e.g., personal computer, portable computer, and the like). The techniques and devices of the present invention permit the local device to be automatically identified and to communicate with the processing device without the need to manually program the processing device to recognize the local device in advance of any communication between the processing device and the local device.

More specifically and in one embodiment of the present invention, a method to automatically identify a local device is presented. The local device is interfaced with an adapting device. The adapting device receives a unique transmission frequency from the processing device. The unique transmission frequency is used by the local device in receiving and sending messages from and to the processing device. Furthermore, the adapting device initially communicates the unique transmission frequency to the local device.

Another embodiment of the present invention, a local device identification system is provided. The local device identification system includes a local device, an adapting device, and a processing device. The adapting device acquires from the processing device a unique transmission frequency for use in communications between the processing device and the local device. Furthermore, the adapting device acquires from the local device local device type that is communicated to the processing device upon initialization.

In yet another embodiment of the present invention an adapting device to identify a local device is described. The adapting device includes a receptacle for receiving a power cord of a local device and a plug that connects to an electrical outlet. Moreover, the adapting device includes a transceiver for transmitting and receiving messages to and from the local device. Furthermore, the adapting device includes a controller that sends an initialization signal over an electrical power line connected to the electrical outlet via the plug to a processing device and receives an initialization from the processing device over the electrical line that identifies a unique transmission frequency for the controller to use or communicate to local device. Also, the controller uses the transceiver to acquire a local device type from the local device and sends the local device type to the processing device.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

As used herein consumer electronic devices/appliances are referred to as local devices. Moreover, a "processing device" refers to a central processing unit being used by a consumer to manage a home network that includes one or more local devices. The processing device can be a personal computer, a laptop computer, a PDA, or a customized processing device designed to achieve the teachings of the present disclosure. Furthermore, use of the phrase "home network" is not intended to be limited to a home, rather, any network such as a business network can be used with the tenets of the present disclosure.

In various embodiments of the present disclosure, a processing device is equipped with an appropriate line interface adapter that detects and transmits various frequencies over an electrical power lines in order to comprise part of a network with one of more local devices. Conventional protocols and line interface adapters can be used to communicate over the electrical power lines, such as X10 protocol as discussed above. However, in the present disclosure the processing device uses the appropriate line interface adapter and electrical power lines to communicate indirectly with the local devices and directly with one or more adapting devices.

The adapting devices of the present disclosure act as an intermediary during initialization between the processing device and the local devices and communicate with the processing device via electrical power lines. The adapting device communicates during initialization with the processing device to receive a unique transmission frequency, which is used for communications between the processing device and the local device and is communicated to the local device. Additionally, in one embodiment, the adapting device acquires a local device type from the local device, which is communicated to the processing device. The processing device can use the local device type to identify and load a command set of instructions that is recognized by the local device. In an alternate embodiment, the protocol used between the processing device and the adapting device requests the device type from the local device. Also, in some embodiments, after initialization the processing device and the local device communicate with one another directly using the unique transmission frequency. In still other alternative embodiments, communications between the processing device and the local device occurs via the adapting device.

Moreover, in some embodiments, the adapting device encodes subsequent messages received from the local devices and communicates these messages to the processing device using the local device type via the electrical power lines. Additionally, in some embodiments, the adapting device decodes messages sent from the processing device having the local device type and communicates these messages to the local devices via a wireless transmission or a hardwired transmission. Accordingly, the processing device, the adapting devices, and the local devices cooperate to form a network within a home, business, or enterprise.

Figure 1:
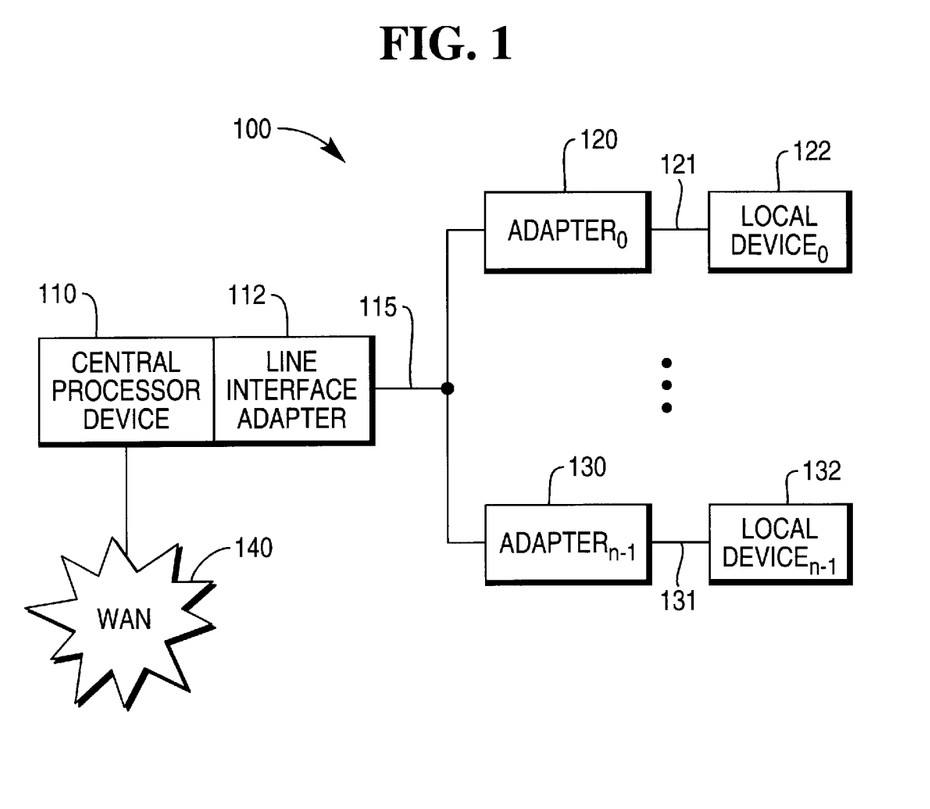
FIG. 1 is a diagram representing a local device identification system, according to the teachings of the present invention.

FIG. 1 illustrates a diagram representing one local device identification system 100, according to the teachings of the present invention. The local device identification system 100 includes a central processing device 110 having a line interface adapter 112, one or more adapting devices (e.g., 120 and 130), where each adapting device (e.g., 120 or 130) is connected to a local device (e.g., 122 and 132). The processing device 110, the adapting devices (e.g., 120 and 130), and the local devices (e.g., 122 and 132) form a networked environment (e.g., Local Area Network (LAN), home network, business network, and the like).

The processing device 110 communicates with the adapting devices (e.g., 120 and 130) via an electrical power line 115 that is used to supply power to the processing device 110, the adapting devices (e.g., 120 and 130), and the local devices (e.g., 122 and 132). The electrical power line 115 is AC power. The line interface adapter 112 can decode and encode frequency modulations occurring over the electrical power line 115. Additionally, the adapting devices (e.g., 120 and 130) include a modem built into the adapting devices (e.g., 120 and 130) (not shown in FIG. 1). The processing device 110 communicates with all of the adapting devices (e.g., 120 and 130) using a standard characteristic wire frequency (CWF) over the electrical power line 115.

The adapting devices (e.g., 120 and 130) plug directly into an electrical wall outlet located in proximity to the local devices (e.g., 122 and 132). Each local device (e.g., 122 or 132) plugs into a single adapting device (e.g., 120 or 130) via a power cord (e.g., 121 or 131). The local devices (e.g., 122 and 132) receive power (e.g., AC power) through the adapting devices (e.g., 120 and 130).

Additionally, each local device (e.g., 122 and 132) includes a transmitter and receiver (or transceiver) for sending and receiving messages to and from the adapting device (e.g., 120 or 130) and/or to and from the processing device 110. The connection between the local devices (e.g., 122 and 132) and the adapting devices (e.g., 120 and 130) is via the power cords (e.g., 121 and 131). The adapting devices (e.g., 120 and 130) also include a transmitter and receiver (or transceiver) for sending and receiving messages to and from the local devices (e.g., 122 and 132). In some embodiments, the processing device 110 also includes a transmitter and receiver (or transceiver) for sending and receiving messages from the local devices (e.g., 122 and 132). Communication of messages among the adapting devices (e.g., 120 and 130), the local devices (e.g., 122 and 132), and the processing device 110 can be achieved using any commercially established protocol (e.g., thin protocol), or any ad hoc developed protocol.

The adapting devices (e.g., 120 and 130) are not dependent on any particular local device (e.g., 122 and 132). In fact, the adapting devices (e.g., 120 and 130) can be disconnected from one local device (e.g., 122 or 132) and used with another local device (122 or 132). As one skilled in the art readily appreciates, this independence of the adapting devices (e.g., 120 and 130) from the local devices (e.g., 122 and 132) permits plug-and-play use of the adapting devices (e.g., 120 and 130) within a home network and does not require the local devices (e.g., 122 and 132) to be dependent on unnecessary hardware and software required to identify the local devices (e.g., 122 and 132) within the network.

When the adapting device (e.g., 120 or 130) is initially plugged into the electrical wall outlet, the adapting device (e.g., 120 or 130) places a signal on the electrical power line 115 that is received by the processing device 110 via the line interface adapter 112. This signal is can be an initialization signal to the processing device 110 indicating that there is a local device (e.g., 122 or 132) that is ready for identification action by the processing device 110. In some embodiments, the adapting devices (e.g., 120 and 130) can include a reset button which when activated places an initialization signal on the electrical power line 115. Additionally, in some embodiments, the adapting devices (e.g., 120 and 130) send an initialization signal each time power is:established or re-established (e.g., whenever the adapting devices (e.g., 120 and 130) are turned off and on, either intentionally or unintentionally) with the adapting devices (e.g., 120 and 130).

Upon receipt of the signal, the processing device 110 calculates a local device unique transmission frequency (UTF) for the identified local device (e.g., 122 or 132). Each of the UTFs calculated and assigned by the processing device 110 is of sufficient bandwidth from each of the remaining UTFs such that confusion is avoided. The processing device 110 can use applications executing on the processing device 110 to recycle and manage all calculated and assigned UTFs. In this way, no manual configuration is required to assign and manage the UTFs. The UTFs act as local identifiers (e.g., similar to traditional IP addresses) for the local devices (e.g., 122 and 132) participating within the network.

Moreover, in some embodiments, once the processing device 110 has calculated and assigned a UTF for a specific local device (e.g., 122 or 132), the processing device 110 thereafter communicates with the adapting device (e.g., 120 or 130) associated with the specific local device (e.g., 122 or 132) via the electrical power line 115. Next, the adapting device (e.g., 120 or 130) decodes the messages and transmits the messages to the specific local device (e.g., 122 and 132) using the UTF. To do this, once an adapting device (e.g., 120 or 130) establishes a UTF for a local device (e.g., 122 or 132), the adapting device (e.g., 120 or 130) sends an identification request to the local device (e.g., 122 or 132) using an adapting device transmitter. The transmitter can be a Radio Frequency (RF) transmitter, an Infrared (IR) transmitter, or a hardwired transmitter (in cases where the adapting device (e.g., 120 or 130) is connected via a hardwired connection to the local device (e.g., 122 or 132). In response to the identification request, the local device (e.g., 122 or 132) responds with a unique local device type identifier, which is then sent by the adapting device (e.g., 120 or 130) to the processing device 110. The processing device 110 uses the local device type identifier to load the appropriate protocol and command set recognized by the local device (e.g., 122 or 132). Moreover, the local device (e.g., 122 or 132) uses the assigned UTF when sending messages to the adapting device (e.g., 120 or 130).

Thus, in some embodiments, an adapting device (e.g., 120 or 130) can filter messages received via an adapting device receiver for messages being transmitted in the UTF from the local device (e.g., 122 or 132), and then encodes the filtered messages for transmission to the processing device 110 via the electrical power line 115. Each transmitted message will include the local device type, so that the processing device 110 can recognize from which local device (e.g., 122 or 132) the messages are associated. Likewise, the adapting device (e.g., 120 or 130) receives messages from the processing device 110, where the messages include the local device type so that the adapting device (e.g., 120 or 130) can determine when a received message is directed to its local device (e.g., 122 or 132). Any message having the appropriate local device type identifier is decoded by the adapting device (e.g., 120 or 130) and transmitted to the local device (e.g., 122 or 132) via the adapting device's transmitter using the assigned UTF. In this way in some embodiments, the adapting devices (e.g., 120 and 130) act as a conduit for communications between the processing device 110 and the local devices (e.g., 122 and 132).

In other embodiments, the adapting devices (e.g., 120 and 130) are used only during the initialization process in order to permit the processing device 110 and the local devices (e.g., 122 and 132) to recognize one another and participate in direct communications with one another. For example, an adapting device (e.g., 120 or 130) sends an initialization signal over the electrical power line 115 to the processing device 110 and receives back a UTF. The adapting device (e.g., 120 or 130) then sends the UTF along with an identification request to a local device (e.g., 122 or 132). The local device (e.g., 122 or 132) responds with a unique local device type identifier, which the adapting device (e.g., 120 or 130) decodes and sends to the processing device 110 over the electrical power line 115. The processing device 110 uses the local device type to identify and load the protocol and command set that is recognized by the local device (e.g., 122 or 132). Thereafter, the processing device 110 and the local device (e.g., 122 or 132) can effectively engage in direct communication with one another by using the UTF, the identified protocol, and the identified command set. Alternatively, once the adapting device (e.g., 120 or 130) establishes the UTF for a local device (e.g., 122 or 132), the protocol used by the processing device 110 can include an initial request that asks the local device (e.g., 122 or 132) for its device type. In this way, the adapting device (e.g., 120 or 130) need not acquire and provide the device type to the processing device, since the protocol can achieve the same with an initial protocol request.

In some embodiments, the UTF can be a specific Radio Frequency (RF) that is used to uniquely identify each local device (e.g., 122 and 132) within the network. Additionally, to avoid interference with other RF networks in proximity to the network established by the processing device 110, the adapting devices (e.g., 120 and 130), and the local devices (e.g., 122 and 132), low pass filters can be placed within the network to filter out other transmissions and prevent errant transmissions from escaping the network. Additionally, in some embodiments, the UTF can be a lower frequency where all communications occur over the electrical power lines.

As one of ordinary, skill in the art now appreciates, a home network can be established which is more flexible than traditional techniques by using the adapting devices: (e.g., 120 and 130) of the present invention. The adapting devices (e.g., 120 and 130) achieve initializations on behalf of the processing device 110 and the local devices (e.g., 122 and 132). In this way, the local devices (e.g., 120 and 130) need only include minimal identification hardware and software to participate within the home network. Additionally, identification of the local devices (e.g., 120 and 130) is automatically configured each time a request is made by an adapting device (e.g., 120 or 130). Therefore, conventional manual configuration of applications executing on the processing device 110 is avoided with the tenets of the present invention.

Additionally, in some embodiments, the processing device 110 is further interfaced to a Wide Area Network 140 (WAN) (e.g., Internet, and the like). In this way, the processing device 110 can use one or more applications to uniquely present each local device (e.g., 122 and 132) to requesting applications executing on the WAN. Moreover, the processing device 110 can be used to communicate commands from the WAN applications to the local devices (e.g., 122 and 132) using the tenets of the present disclosure. Additionally, the processing device 110 can be used to communicate commands or information originating from the local devices (e.g. 122 and 132) to the WAN applications. In this way, the local devices (e.g., 122 and 132) are remotely accessible via the Internet (e.g., WAN) without the need to have a uniquely assigned IP address for each of the local devices (e.g., 122 and 132).

Figure 2:
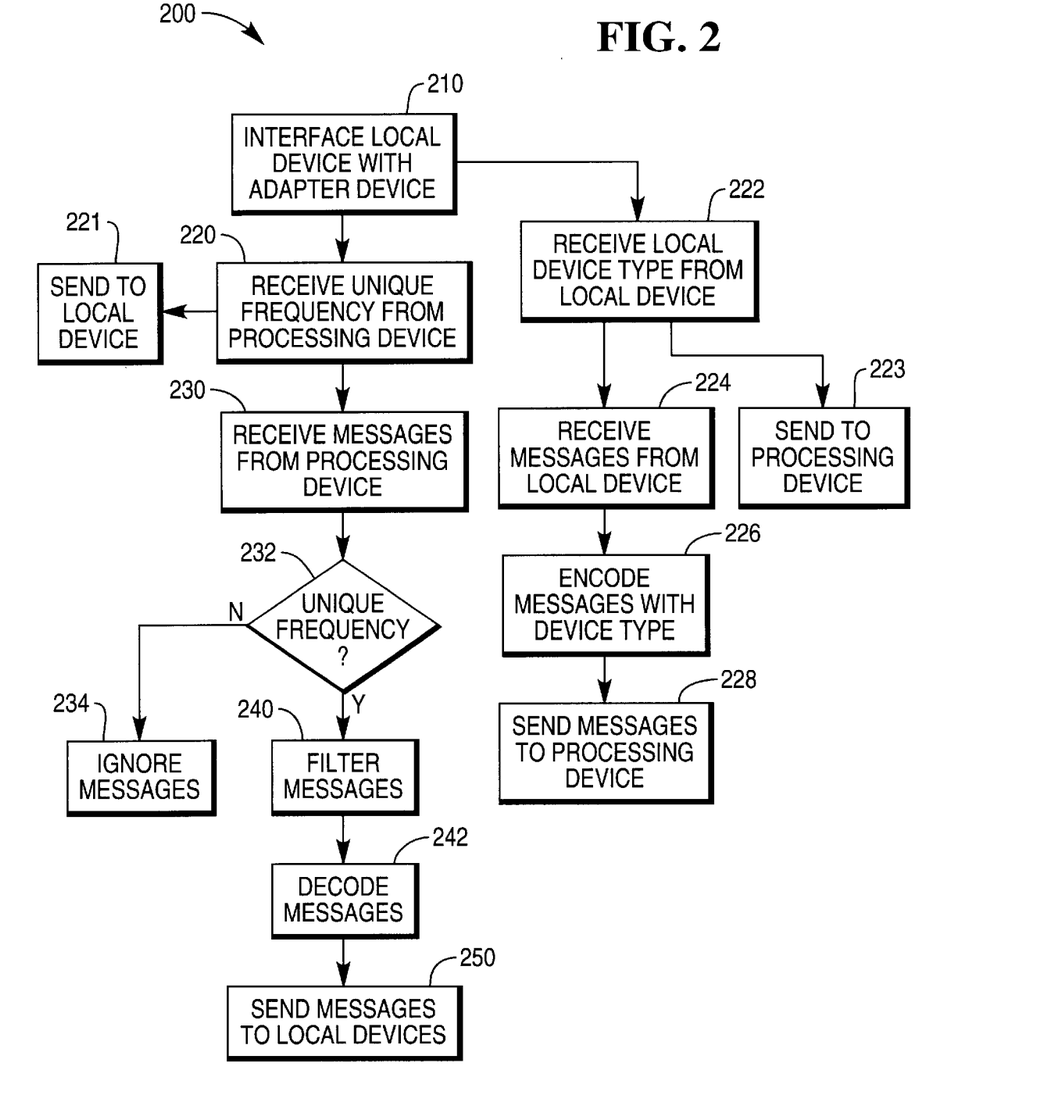
FIG. 2 is a diagram of a flowchart representing a method to automatically identify a local device, according to the teachings of the present invention.

FIG. 2 is a diagram of a flowchart representing one method 200 to automatically identify a local device, according to the teachings of the present invention. The method 200 can be implemented to establish a home network that comprises a main processing device, a number of adapting devices, and a number of local devices. The processing device includes a number of line interface adapters and software applications to manage the network, and can be a traditional personal computer, PDA, any central processing unit, or computing device used to manage the home network.

In some embodiments, the processing device is interfaced to a Wide Area Network (WAN) (e.g., Internet, and the like). Thus, the processing device acts as a gatekeeper for the commands originating from the WAN and directed to the local devices. Similarly, the processing device acts as a gatekeeper for commands or information being transmitted by the local devices to applications existing on the WAN.

Initially, in 210, an adapting device is interfaced with a local device. The interface can be achieved via wireless transmissions (e.g., RF, IR, and the like) or via hardwired transmissions (e.g., phone lines, Ethernet lines, cable lines, electrical power lines, and the like). Any standard communication protocol can be used in the interface transmission (e.g., thin protocols and others). Additionally, the local device's power cord plugs into the adapting device and receives power via the adapting device. In turn the adapting device plus into an electrical wall outlet to receive power via an electrical power line.

Initialization of the adapting device can be achieved by plugging it into the electrical wall outlet, by activating a reset button located on the adapting device, or by re-establishing power after the power supply was terminated for some reason (e.g., initialization occurs anytime the adapting device's power is turned from off to on). In some instances, the processing device can request and issue a re-initialization request to the adapting device. Upon initialization, the adapting device sends a signal to the processing device indicating that there is a local device present and it is ready for initialization action by the processing device. The adapting device transmits or otherwise communicates the signal via the electrical power line using a CWF, which all additional adapting devices use to communicate with the processing device via the electrical power lines.

In 220, once the processing device receives an initialization signal, it responds over the electrical power lines with a message that includes a UTF that is to be used by the local device associated with the adapting device. Next, in 221, the adapting device transmits or otherwise communicates the UTF to the local device. Additionally, in one embodiment, the adapting device request a local device type identification from the local device, and receives a local device type in 222 from the local device. The local device type identifies the type of device. In 223, the adapting device encodes the local device type and the UTF in a message that is then transmitted over the electrical power line in the CWF to the processing device. The processing device identifies the UTF and associates the local device type with the UTF. Moreover, the processing device uses the local device type to determine which protocol and command set that needs to be used when communicating with the local device. In other embodiments, only a confirmation is sent from the adapting device to the processing device indicating that the local device now knows its UTF. In these embodiments, a protocol used with the UTF can be used directly by the processing device to request the local device type from the local device.

After initialization, and in one embodiment, the adapting device continues to act as a transparent, pass-through, intermediary between the processing device and the local device. Thus, in 224, the adapting device receives local device initiated messages from the local device via an adapting device receiver. These messages are encoded, in 226, into messages that are sent, in 228, to the processing device over the electrical power line in the CWF. The encoded messages include the local device type and/or the UTF so that the processing device can recognize from which local device the messages are originating.

Likewise, in the embodiment where the adapting device continues to act as a transparent, pass-through, intermediary between the processing device and the local device, the adapting device detects messages being sent from the processing device over the electrical power line in the CWF, as depicted in 230. In 232, the adapting device inspects the messages for the UTF assigned during initialization to the adapting device's connected local device (connected via the power cord of the local device). If the message does not include the UTF, then in 234 the message is ignored. However, if the message does include the UTF, then in 240 the message is filtered and decoded in 242. Finally, the filtered and decoded message is sent to the local device via the adapting device's transmitter, as depicted in 250.

In other embodiments, after the adapting device establishes initialization on behalf of the local device, the processing device and the local device are free to directly communicate with one another using the UTF that was established during initialization. Direct communications between the local device and the processing device is wireless (e.g., RF, and the like). In some instances, the direct communications can be IR such as when the local device is in close enough proximity to the processing device.

As one of ordinary skill in the art now appreciates, the implementation of method 200 provides an improved approach to networking local devices with a processing device. This is achieved by off-loading some of the intelligence associated with assigning and configuring local device identifiers to adapting devices of the present disclosure. The adapting devices permit devices to be moved around and installed with ease, without disruption in the performance of the network, and without requiring manual configuration and/or manual adjustments to applications executing on the processing device.

Figure 3:
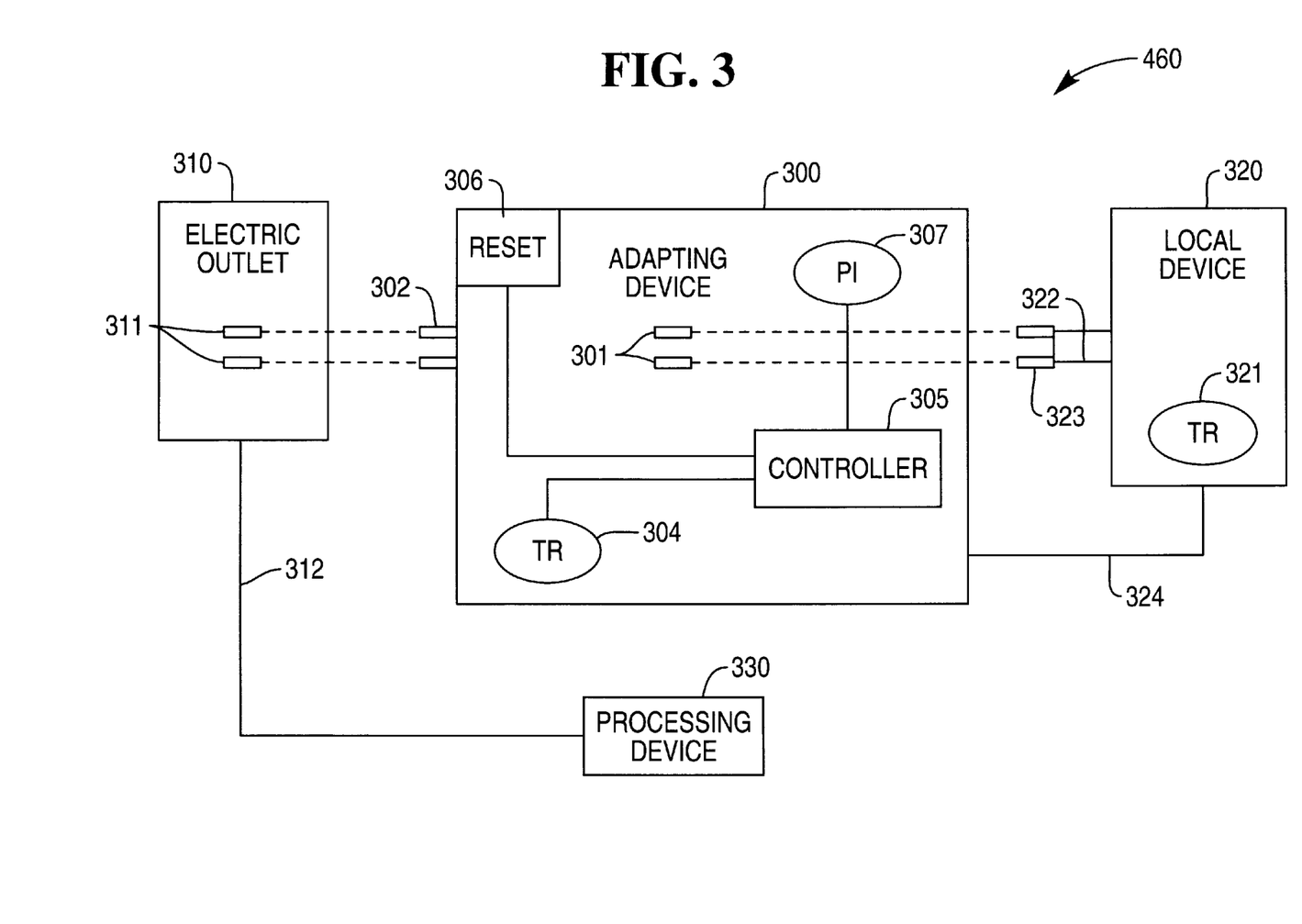
FIG. 3 is a diagram representing an adapting device for identifying a local device, according to the teachings of the present invention.

FIG. 3 illustrates a diagram representing one adapting device 300 for identifying a local device, according to the teachings of the present invention. The adapting device 300 includes a receptacle 301 that receives a power cord 322 plug 323 from a local device 320. Moreover, the adapting device 300 includes a plug 302 that connects to an electrical outlet 310 via an electrical outlet receptacle 311. Further, the adapting device 300 includes a transceiver TR 304, that is transmits and receives messages to and from the local device 320. The local device 320 also includes a TR 321 that transmits and receives messages to and from the adapting device 300 and/or to and from a processing device 330.

The adapting device 300 also includes a controller 305, which is one or more software applications executing within a processor having memory (e.g., volatile and/or non-volatile). The controller 305, during initialization, sends and initialization signal over an electrical power line 312, which is received by the processing device 330. In response the processing device 330 sends and acknowledgement back to the adapting device and the controller 305 via the electrical power line 312. The acknowledgement includes a UTF for the controller 305 to use or to communicate to the local device 320.

The UTF is calculated and managed by one or more applications executing on the processing device 330. After the UTF is established, the controller 305, in one embodiment, requests a local device type identification from the local device 320, by using the adapting device's TR 304. The local device's TR 321 receives the request and provides the local device type to the controller 305 via the TR 321. The controller 305 acquires the local device type from the TR 304 and encodes the local device type and the UTF in a message that is then transmitted to the processing device 330 over the electrical power line 312 through the plug 302. In an alternative embodiment, the controller 305 merely confirms that the local device 320 has successfully acknowledged the UTF. In this latter embodiment, a protocol used by the processing device 330 can then initially request the local device type directly from the local device 320 by using the UTF.

In response to receiving the local device type, applications executing on the processing device 330 load the appropriate protocol, in some embodiments, and command sets recognized by the local device 320, and communications between the local device 320 and the processing device 330 can now commence. As one skilled in the art readily appreciates this is achieved entirely automatically without any manual configuration being required.

In one embodiment, the adapting device includes a reset switch or button 306. The reset switch 306 can be used to re-initiate the initialization process as described above. Initialization can also be automatically achieved each time power is established to the adapting device 300. Moreover, in some embodiments, the adapting device 300 includes a power indicator 307 light that indicates when the adapting device 300 is receiving power through the electrical power line 312.

The adapting device's TR 304 and the local device's TR 321 can be interfaced using wireless transmissions (RF, IR, and the like) or optionally via a hardwired transmission 324 (phone line, Ethernet line, cable line, electrical power line 312, and the like). Any protocol (e.g., thin protocol, and others) can be used to communicate between the local device 320 and the adapting device 300.

In one embodiment, after initialization, the adapting device 300 continues to act as an intermediary for messages being sent between the local device 320 and the processing device 330. In this embodiment, the controller 305 identifies processor-initiated messages received over the electrical power line 312 to obtain only those messages that include the originally assigned UTF. The controller 305 then decodes these processor-initiated messages and causes the processor-initiated messages to be transmitted to the local device via the TR 304.

Alternatively, in another embodiment and after initialization, the processing device 330 and the local device 320 directly communicate with one another using the assigned UTF. In this embodiment, the processing device 330 and the local device 320 use their respective transceivers to wireless communicate with one another using any standard protocol (e.g., thin protocol, and others) recognized by the local device 320.

As one of ordinary skill in the art now appreciates upon reading and comprehending the present disclosure, local devices 320 can de divorced of hardware and software required to uniquely identify the local devices 320 to a processing device 330, and a more portable and flexible adapting device 300 can be used. The adapting device 300 can be reconfigured at will, and used with different local devices 320 if desired. New local devices 320 are automatically configured and installed as soon as they are connected to the adapting devices 300 through a power cord 322 having a plug 323. This is an improvement over conventional approaches that require identification hardware and software to be present in the local devices and require manual configuration of applications executing on the processing device.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method to automatically identify a local device, comprising:
   interfacing the local device with an adapting device;
   receiving a unique transmission frequency from the processing device via electrical power lines, wherein the unique transmission frequency is received by the adapting device;
   communicating the unique transmission frequency to the local device for use by the local device in receiving and sending messages from and to the processing device, wherein the unique transmission frequency is initially communicated by the adapting device;
   receiving a local device identifier from the local device; and
   communicating the local device identifier to the processing device using the unique transmission frequency for use by the processing device in receiving and sending messages from and to the local device.

2. The method of claim 1, wherein in interfacing the local device, the local device plugs into the adapting device and the adapting device plugs into an electrical outlet, and the local device is interfaced to the adapting device using wireless protocols.

3. The method of claim 1, further comprising receiving from the local device a local device type, wherein the local device type is transmitted to the processing device by the adapting device using the electrical power lines.

4. The method of claim 1, further comprising intercepting by the adapting device a number of processor initiated messages communicated by the processing device to the local device over the electrical power lines, and decoding the processor initiated messages by the adapting device and transmitting the decoded messages to the local device.

5. The method of claim 4, further comprising intercepting by the adapting device a number of local device initiated messages communicated by the local device to the processing device, and encoding the local device initiated messages by the adapting device and transmitting the decoded messages to the processing device over the electrical power lines.

6. The method of claim 1, wherein in interfacing the local device, the adapting device interfaces with the local device using at least one of a Radio Frequency (RF) transmission or an Infrared (IR) transmission.

7. The method of claim 1 wherein in communicating the unique transmission frequency, the adapting device communicates with the local device via a hardwired connection.

8. A local device identification system, comprising:
   a local device;
   an adapting device;
   a processing device;
   wherein the adapting device automatically acquires from the processing device a unique transmission frequency for use in communications between the processing device and the local device, and wherein the adapting device automatically acquires from the local device a local device type that is communicated to the processing device upon initialization; and
   wherein the adapting device acquires the unique transmission frequency by sending a signal to the processing device over electrical power lines indicating that the local device is present, the processing device in response to the signal assigns the unique transmission frequency for the local device and transmits the unique frequency to the adapting device over the electrical power lines.

9. The local device identification system of claim 8, wherein the adapting device transmits a number of the communications received from the local device to the processing device over the electrical power lines using the local device type.

10. The local device identification system of claim 8, wherein the local device is an intelligent appliance and the processing device is a computing device.

11. The local device identification system of claim 8, wherein the processing device is interfaced to an external network and operable to receive commands from the external network that are associated with the local device and to transmit the commands to the local device using the unique transmission frequency.

12. The local device identification system of claim 8, wherein the processing device is interfaced to an external network and operable to receive information from the local device and to provide the information to the external network.

13. The local device identification system of claim 8, wherein the local device, the adapting device, and the processing device comprise a network where the local device is an intelligent appliance and the processing device is central processing unit for the network.

14. An adapting device to identify a local device, comprising:
   a receptacle for receiving a power cord of a local device;
   a plug that connects to an electrical outlet;
   a transceiver for transmitting and receiving messages to and from the local device;
   a controller that automatically sends an initialization signal over an electrical power line connected to the electrical outlet via the plug to a processing device and receives an initialization acknowledgement from the processing device over the electrical line that identifies a unique transmission frequency for the controller to use or to communicate to the local device; and
   wherein the controller uses the transceiver to automatically acquire a local device type from the local device, and the controller sends the local device type to the processing device.

15. The adapting device of claim 14 further comprising, a reset switch that when activated sends the initialization signal to the processing device.

16. The adapting device of claim 15, wherein the reset switch is automatically activated each time a power used by the adapting device is established.

17. The adapting device of claim 14 wherein the transceiver communicates with the local device via a hardwired connection.

18. The adapting device of claim 14 wherein the transceiver communicates with the local device via a wireless connection.

19. The adapting device of claim 14 wherein the adapting device decodes processing device messages before using the transceiver to send the processing device messages to the local device, and wherein the adapting device encodes local device messages before using the electrical power line to send the local device messages to the processing device.

20. The adapting device of claim 14 wherein the processing device uses the local device type to identify a command set recognized by the local device, and wherein the processing device uses the command set to communicate directly with the local device using the unique transmission frequency.

* * * * *

UNITED STATES PATENT AND TRADEMARK OFFICE
CERTIFICATE OF CORRECTION

PATENT NO. : 6,771,164 B1
DATED : August 3, 2004
INVENTOR(S) : Fink, R.

It is certified that error appears in the above-identified patent and that said Letters Patent is hereby corrected as shown below:

Title page,
Item [73], Assignee, delete "NRC" and insert -- NCR --.

Signed and Sealed this

Twentieth Day of December, 2005

JON W. DUDAS
*Director of the United States Patent and Trademark Office*